United States Patent
Park

(10) Patent No.: US 6,863,547 B2
(45) Date of Patent: Mar. 8, 2005

(54) METHOD FOR SUPPRESSING ELECTROMAGNETIC INTERFERENCE OF ELECTRONIC DEVICE AND ELECTRONIC DEVICE WITH SUPPRESSED ELECTROMAGNETIC INTERFERENCE BY THE METHOD

(75) Inventor: Hee-Keun Park, Taipei (TW)

(73) Assignee: Averatec Asia Incorporation, Taipei (TW)

( * ) Notice: Subject to any disclaimer, the term of this patent is extended or adjusted under 35 U.S.C. 154(b) by 0 days.

(21) Appl. No.: 10/428,438

(22) Filed: May 1, 2003

(65) Prior Publication Data

US 2004/0219842 A1 Nov. 4, 2004

(51) Int. Cl.⁷ .............................................. H01R 13/648
(52) U.S. Cl. ........................................ 439/95; 439/66
(58) Field of Search ..................... 439/66, 76.1, 92, 439/95; 361/818, 816, 679–681, 799, 800

(56) References Cited

U.S. PATENT DOCUMENTS

| | | | | |
|---|---|---|---|---|
| 3,795,888 A | * | 3/1974 | Nardo et al. ................. | 439/630 |
| 4,566,746 A | * | 1/1986 | Hobson ....................... | 439/588 |
| 4,630,338 A | * | 12/1986 | Osterland et al. ............. | 24/293 |
| 4,640,979 A | * | 2/1987 | Schmalzl ................ | 174/35 GC |
| 4,741,703 A | * | 5/1988 | Johnescu et al. .............. | 439/63 |
| 5,108,312 A | * | 4/1992 | Sampson ..................... | 439/607 |
| 5,218,760 A | * | 6/1993 | Colton et al. .................. | 29/845 |
| 5,272,594 A | * | 12/1993 | Delamoreaux .............. | 361/736 |
| 5,603,620 A | * | 2/1997 | Hinze et al. ................... | 439/95 |
| 5,626,488 A | * | 5/1997 | Albeck et al. ............... | 439/395 |
| 5,647,748 A | * | 7/1997 | Mills et al. .................... | 439/81 |
| 5,659,459 A | * | 8/1997 | Wakabayashi et al. ...... | 361/753 |
| 5,707,244 A | * | 1/1998 | Austin ......................... | 439/95 |
| 5,833,480 A | * | 11/1998 | Austin ......................... | 439/95 |
| 5,906,496 A | * | 5/1999 | DelPrete et al. .............. | 439/95 |
| 5,934,915 A | * | 8/1999 | Henningsson et al. ........ | 439/92 |
| 5,949,019 A | * | 9/1999 | Sirainen .................... | 174/35 R |
| 6,065,980 A | * | 5/2000 | Leung et al. .................. | 439/92 |
| 6,071,131 A | * | 6/2000 | Pliml, Jr. ...................... | 439/95 |
| 6,077,095 A | * | 6/2000 | DelPrete et al. .............. | 439/92 |
| 6,099,327 A | * | 8/2000 | Chen ........................... | 439/95 |
| 6,239,973 B1 | * | 5/2001 | Taylor et al. ................ | 361/704 |
| 6,338,629 B1 | * | 1/2002 | Fisher et al. .................. | 439/66 |
| 6,345,994 B1 | * | 2/2002 | Johnson ....................... | 439/95 |
| 6,359,215 B1 | * | 3/2002 | Horng ................... | 174/35 GC |
| 2001/0002343 A1 | * | 5/2001 | Suzuki ....................... | 439/101 |
| 2002/0142632 A1 | * | 10/2002 | Moore ......................... | 439/95 |

* cited by examiner

*Primary Examiner*—Ross Gushi
*Assistant Examiner*—Larisa Tsukerman

(57) ABSTRACT

An electronic device, such as a notebook computer, includes a main board housed in a casing that is at least partly constituted by a conductive member. A grounding path is established between the main board and the casing by arranging a resilient grounding tab, made of a conductive material, between the main board and the casing. The grounding tab has a U- or V-shape including first and second limbs. The first limb is positioned on the main board with a free end of the second limb engaging the casing and maintaining secured engagement with the casing by means of elastic deformation thereof. The first limb has legs perpendicularly extending therefrom for inserting into through holes defined in the main board. The legs are soldered to the main board by through-hole techniques to fixedly mount the grounding tab to the main board. A secured grounding path is thus established between the main board and the casing for suppressing electromagnetic interference of the electronic device.

9 Claims, 4 Drawing Sheets

METHOD FOR SUPPRESSING ELECTROMAGNETIC INTERFERENCE OF ELECTRONIC DEVICE AND ELECTRONIC DEVICE WITH SUPPRESSED ELECTROMAGNETIC INTERFERENCE BY THE METHOD

BACKGROUND OF THE INVENTION

1. Field of the Invention

The present invention relates generally to the elimination of electromagnetic interference (EMI) induced in an electronic device, such as a notebook computer, and in particular to eliminating EMI by forming a grounding path between a main board and a conductive casing.

2. The Related Art

Electromagnetic interference (EMI) is a great concern for designers and manufacturers of electronic devices operating at high frequency and speed. For example, a notebook computer is subject to EMI when not properly protected. Meanwhile, EMI caused by the operation of the notebook computer may also lead to serious interference with other electronic devices, such as medical equipments. Thus, eliminating EMI is a very important issue for notebook computer designers and manufacturers.

Electronic devices like notebook computers comprise a main board housed in a casing, which is at least partly constituted by a conductive member. To suppress EMI, the notebook computer is provided with a grounding path between the casing and the main board. A conventional way to establish the grounding path between the casing and the main board is to secure a conductive grounding member between the main board and the casing. The conductive grounding member may assume a U- or V-shape having two opposite limbs, a first one of which is soldered to the main board and a second one of which is resilient and is subject to an elastic deformation caused by engaging the casing. Since a great number of electronic parts are soldered to the main board by the surface mounting technique (SMT), conventionally, the grounding member is also mounted to the main board by SMT. SMT requires high positioning precision and small dimension tolerance, which makes the mounting of the grounding member sophisticated and costly.

SUMMARY OF THE INVENTION

Thus, an object of the present invention is to provide a method for simplifying the establishment of grounding path between a main board of an electronic device and a casing of the device whereby electromagnetic interference is effectively suppressed. The present invention also provides an electronic device with reduced electromagnetic interference by means of the method of the present invention.

To achieve the above object, in accordance with the present invention, there is provided a method for suppressing electromagnetic interference in an electrical device, such as a notebook computer, comprising a main board housed in a casing that is at least partly constituted by a conductive member. The method comprises forming a grounding path between the main board and the casing by arranging a resilient grounding tab, made of a conductive material, between the main board and the casing. The grounding tab has a U- or V-shape including first and second limbs. The first limb is positioned on the main board with a free end of the second limb engaging the casing and maintaining secured engagement with the casing by means of elastic deformation thereof. The first limb has legs perpendicularly extending therefrom for inserting into through holes defined in the main board. The method also comprises a step of soldering the legs to the main board by through-hole techniques to fixedly mount the grounding tab to the main board. A secured grounding path is thus established between the main board and the casing for suppressing electromagnetic interference of the electronic device.

BRIEF DESCRIPTION OF THE DRAWINGS

The present invention will be apparent to those skilled in the art by reading the following description of the best mode for carrying out the present invention, with reference to the attached drawings, in which.

DETAILED DESCRIPTION OF THE BEST MODE FOR CARRYING OUT THE PRESENT INVENTION

Figures 2, 2A:
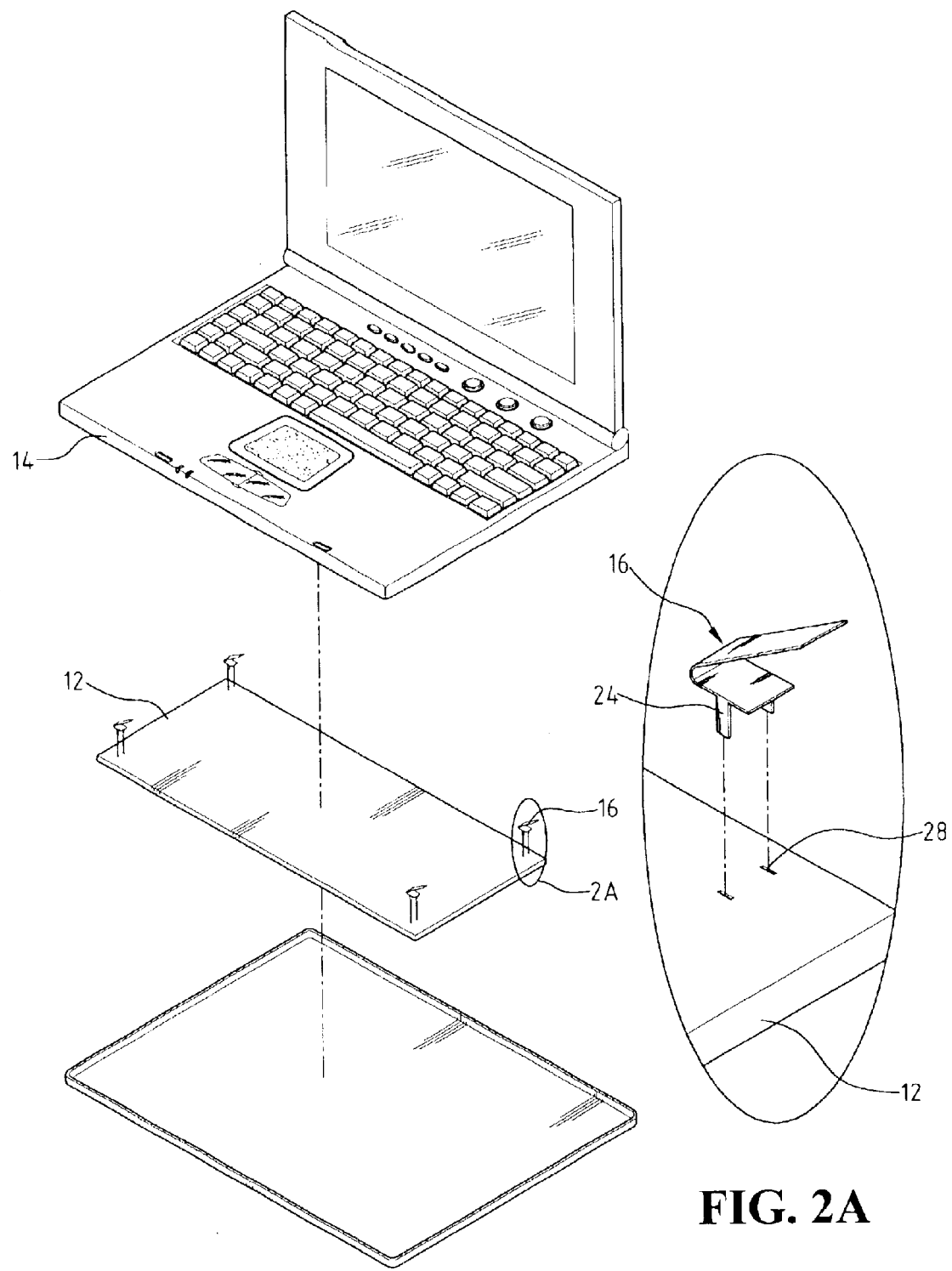
FIG. 2 is an exploded view of a notebook computer in which the grounding tab is incorporated to establish a grounding path for suppressing electromagnetic interference in accordance with the present invention.
FIG. 2A is an enlarged view of encircled portion 2A of FIG. 2.
Figure 3:
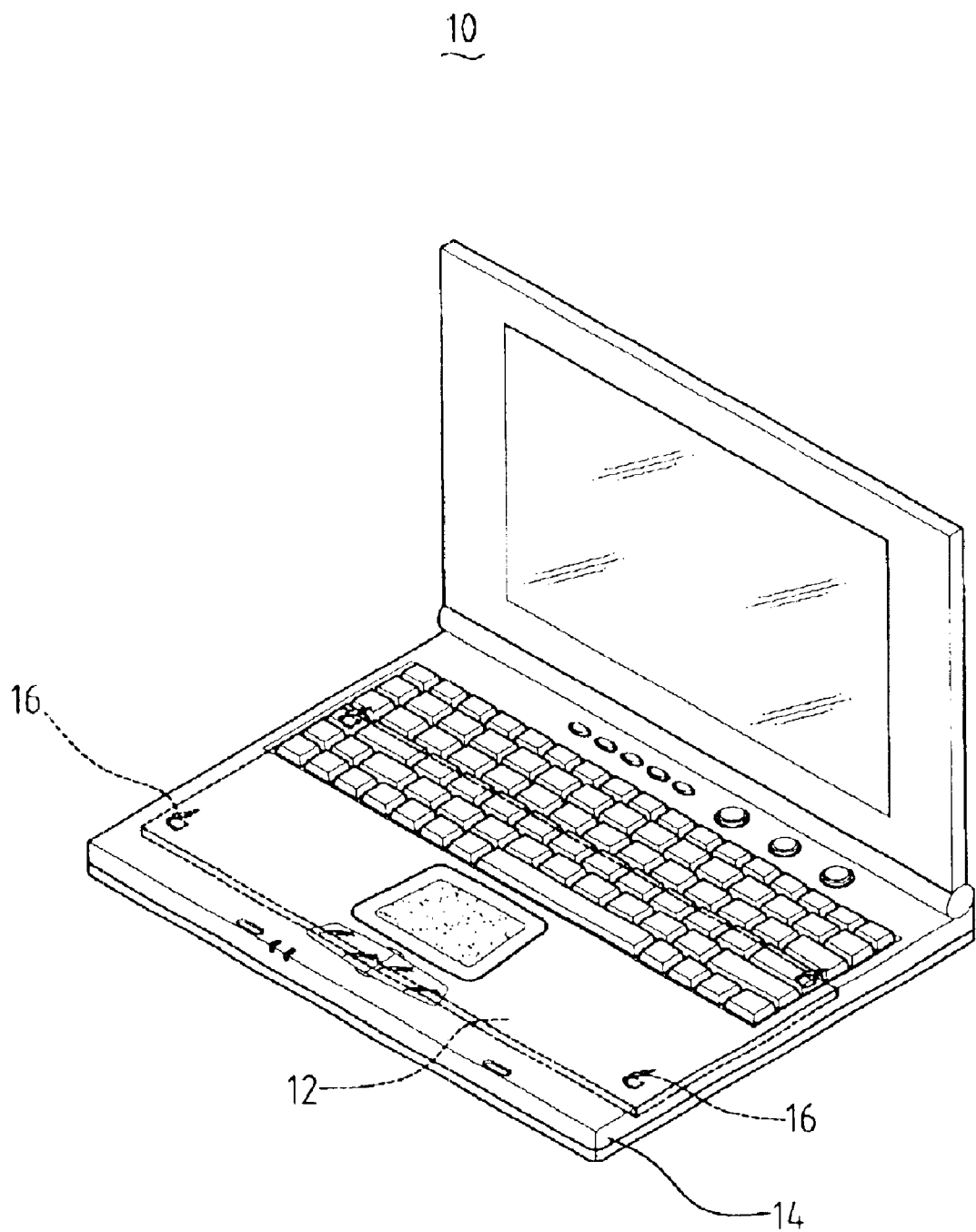
FIG. 3 is an assembled view of FIG. 2.

With reference to the drawings and in particular to FIGS. 2, 2A and 3, an electronic device, such as a notebook computer as shown in the drawings, generally designated with reference numeral 10, comprises a main board 12 on which electronic parts (not shown), such as integrated circuits and transistors, are mounted. The main board 12 is housed in a casing 14, which is at least partly constituted by a conductive material, such as metal alloy, or which comprises a conductive member. To establish a grounding path between the casing 14 and the main board 12, a number of grounding tabs 16, made of a conductive material, are secured between the casing 14 and the main board 12 and engage the casing 14 or the conductive member of the casing 14.

Figure 1:
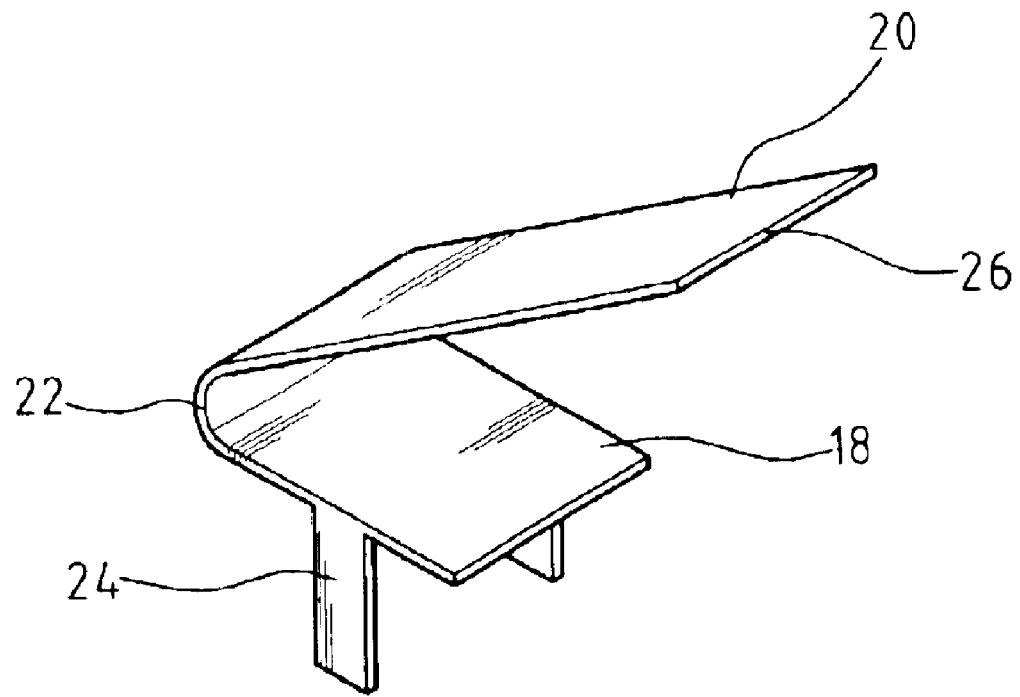
FIG. 1 is a perspective view of a grounding tab constructed in accordance with the present invention.
Figure 4:
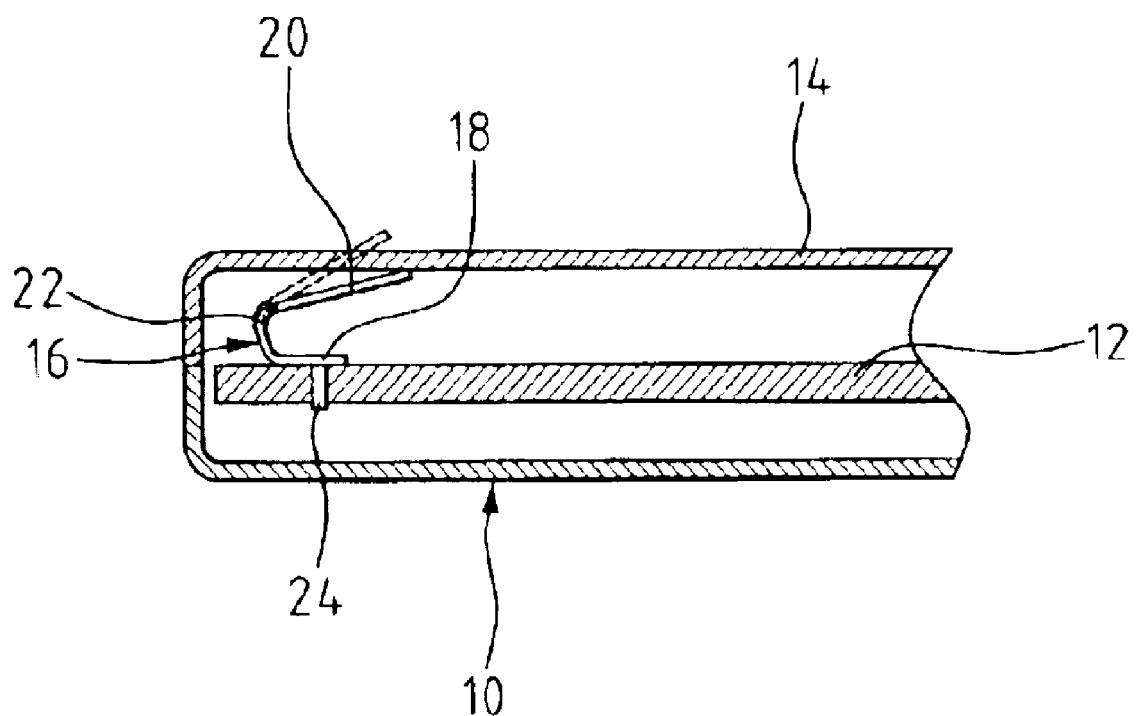
FIG. 4 is a cross-sectional view of the notebook computer of FIG. 3, showing the grounding path between a main board and a casing of the notebook computer formed by the grounding tab of the present invention.

Also referring to FIGS. 1 and 4, the grounding tab 16 is made in the form of a U- or V-shaped, having opposite first and second limbs 18, 20 connected together by a resilient connection 22. The first limb 18 of the grounding tab 16 is mounted to the main board 12 by soldering with the second limb 20 resiliently supported by the connection 22 above and spaced from the main board 12. The second limb 20 is sized to have a free end 26 thereof engaging the casing 14 and the connection 22 is subject to an elastic deformation as indicated by the phantom lines of FIG. 4. The elastic deformation of the connection 22 makes the engagement between the free end 26 of the second limb 20 with the casing sound and secured.

The first limb 18 forms two legs 24 extending from and substantially perpendicular to the first limb 18. The perpendicular extension of the legs 24 from the first limb 18 allows the legs 24 to be inserted into through holes 28 defined in the main board 12 while the first limb 18 is resting on the main board 12. The extension of the legs 24 through the holes 28 fixedly secures the grounding tab 16 in position, which allows for efficient soldering of the grounding tab 16 to the main board 12 by the through-hole techniques. As can be seen from FIG. 4, the first limb 18 is placed flatly on the main board 12. The second limb 20 faces the first limb 18 and is biased against the top of the casing 14 to cause the elastic deformation of the connection 22.

Thus, the present invention provides a method for suppressing EMI of an electronic device by establishing a grounding path between a main board and a casing of the electronic device. The method comprises the steps of (1) defining holes in the main board of the electronic device, (2) providing a grounding tab having first limb positionable on the main board and a second limb resiliently supported above and spaced from the main board for engaging the casing of the electronic device, the first limb forming legs perpendicular to the first limb, (3) inserting the legs through the holes of the main board and (4) soldering the legs to the main board by means of the through-hole techniques. The method may further comprise a step of inserting legs of an additional grounding tab into corresponding holes defined in the main board before the step of soldering the legs to the main board for mounting more grounding tabs between the main board and the casing.

The best mode for carrying out the present invention has been described as an illustration of the present invention. It is apparent that modifications and changes may be made without departing from the scope of the present invention which is intended to be defined by the appended claims.

What is claimed is:

1. A method for suppressing electromagnetic interference of an electronic device comprising a main board housed in a casing having at least a conductive portion, the method comprising the following steps:

(1) forming through holes in the main board;

(2) providing a grounding tab comprising first and second sections connected to each other, the first section having legs perpendicularly extended from two opposite edges of the first section and the second section being resilient and forming a casing contact arm facing the first section;

(3) placing the first section on the main board by inserting the legs into the through holes of the main board with the second section directly above the first section and the casing contact arm engaging the casing; and (4) soldering the legs to the main board;

wherein the first section forms a substantially rectangular slab lying on the main board between the legs.

2. The method as claimed in claim 1 wherein the first and second sections are connected to each other by a resilient connection portion and the grounding tab has a U-shape.

3. The method as claimed in claim 1, wherein the grounding tab has a V-shape.

4. The method as claimed in claim 1, before step (4) the method further comprising a step of inserting legs of an additional grounding tab into corresponding holes defined in the main board with a casing contact arm of the additional grounding tab engaging the casing.

5. The method as claimed in claim 1, wherein the legs of the grounding tab are soldered to the main board by means of through-hole techniques.

6. An electronic device comprising a conductive casing and a main board enclosed in the casing, a device for suppressing electromagnetic interference comprising a conductive body having a first section attached to the main board with legs perpendicularly extended from two opposite edges of the first section, the legs being received in corresponding through holes in the main board for electrical connection therewith, and a resilient second section extending from the first section, directly above and facing the first section and resiliently engaging the casing, wherein the first section forms a substantially rectangular slab lying on the main board between the legs.

7. The electronic device as claimed in claim 6, wherein the conductive body comprises a U-shaped configuration.

8. The electronic device as claimed in claim 6, wherein the conductive body comprises a V-shaped configuration.

9. The electronic device as claimed in claim 6, wherein the electronic device comprises a notebook computer.

* * * * *